(12) United States Patent
Ogata et al.

(10) Patent No.: US 9,137,403 B2
(45) Date of Patent: Sep. 15, 2015

(54) IMAGE FORMING APPARATUS

(71) Applicant: CANON KABUSHIKI KAISHA, Tokyo (JP)

(72) Inventors: Atsushi Ogata, Mishima (JP); Ichiro Yasumaru, Mishima (JP); Kazushi Ino, Suntou-gun (JP); Hiroshi Kato, Odawara (JP); Daisuke Kaneko, Suntou-gun (JP); Tomoyuki Iwakoshi, Suntou-gun (JP); Hiroto Endo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/252,967

(22) Filed: Apr. 15, 2014

(65) Prior Publication Data
US 2014/0320939 A1 Oct. 30, 2014

(30) Foreign Application Priority Data
Apr. 25, 2013 (JP) .................................. 2013-092113

(51) Int. Cl.
*H04N 1/04* (2006.01)
*H04N 1/00* (2006.01)

(52) U.S. Cl.
CPC ................................ *H04N 1/00572* (2013.01)

(58) Field of Classification Search
CPC ....... H04N 1/193; H04N 1/12; H04N 1/0057; H04N 1/121; H04N 2201/00631
USPC .......... 358/496, 498, 401, 501, 296; 399/364, 399/367, 374
See application file for complete search history.

(56) References Cited

U.S. PATENT DOCUMENTS

| | | | |
|---|---|---|---|
| 6,382,616 B1 | 5/2002 | Waragai et al. | |
| 6,804,473 B2 | 10/2004 | Nakamura et al. | |
| 6,826,374 B2 | 11/2004 | Kato et al. | |
| 7,597,311 B2 | 10/2009 | Kawata et al. | |
| 8,434,753 B2 | 5/2013 | Fukatsu et al. | |
| 8,720,886 B2 | 5/2014 | Kuroda et al. | |
| 2013/0181394 A1 | 7/2013 | Ogata et al. | |
| 2013/0292898 A1* | 11/2013 | Miyamoto et al. | ............ 271/227 |
| 2013/0293907 A1* | 11/2013 | Aoki et al. | .................... 358/1.12 |
| 2013/0293908 A1* | 11/2013 | Takahashi | .................... 358/1.12 |

(Continued)

FOREIGN PATENT DOCUMENTS

JP 2006-232467 A 9/2006

*Primary Examiner* — Cheukfan Lee
(74) *Attorney, Agent, or Firm* — Fitzpatrick, Cella, Harper & Scinto

(57) ABSTRACT

An image forming apparatus includes a first conveying path which connects between a sheet feed portion and a sheet discharging portion, and on which a image forming portion is arranged. The image forming apparatus further includes a second conveying path configured to guide the sheet on which the image has been formed on one surface thereof by the image forming portion to the first conveying path again, a document conveying path, and a reading portion. The document conveying path includes a document feeding path, a document discharging path, and a common conveying path which serves as at least a part of the second conveying path, and guides the document from a document feed portion to a document discharging portion through the document feeding path, the common conveying path and the document discharging path without causing the document to pass through the image forming position. The reading portion reads a first face and a second face of the document which is fed from the document feed portion.

12 Claims, 15 Drawing Sheets

(56) References Cited

U.S. PATENT DOCUMENTS

| | | |
|---|---|---|
| 2013/0293909 A1 | 11/2013 | Endo et al. |
| 2013/0293913 A1* | 11/2013 | Takayama et al. ........... 358/1.13 |
| 2013/0308166 A1* | 11/2013 | Uchidate et al. ............. 358/3.28 |
| 2014/0079456 A1* | 3/2014 | Nakajima et al. ............. 399/367 |
| 2014/0079457 A1* | 3/2014 | Nakajima et al. ............. 399/367 |
| 2014/0320873 A1* | 10/2014 | Kato et al. .................... 358/1.12 |
| 2014/0320877 A1* | 10/2014 | Kaneko et al. ................ 358/1.13 |
| 2014/0320929 A1* | 10/2014 | Kato et al. .................... 358/296 |
| 2014/0320940 A1* | 10/2014 | Ino et al. ....................... 358/498 |
| 2014/0321897 A1* | 10/2014 | Ogata et al. ................... 399/373 |
| 2014/0327921 A1* | 11/2014 | Ogata et al. ................... 358/1.12 |

* cited by examiner

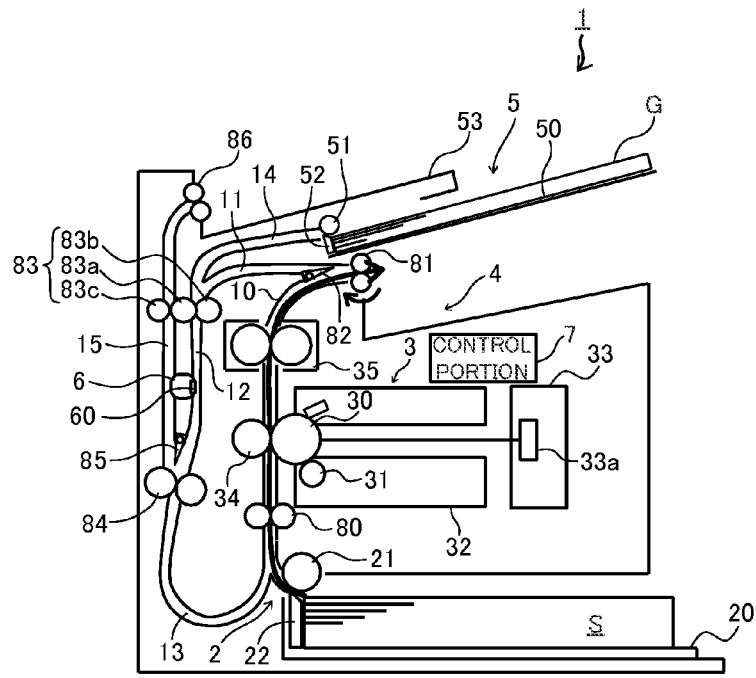
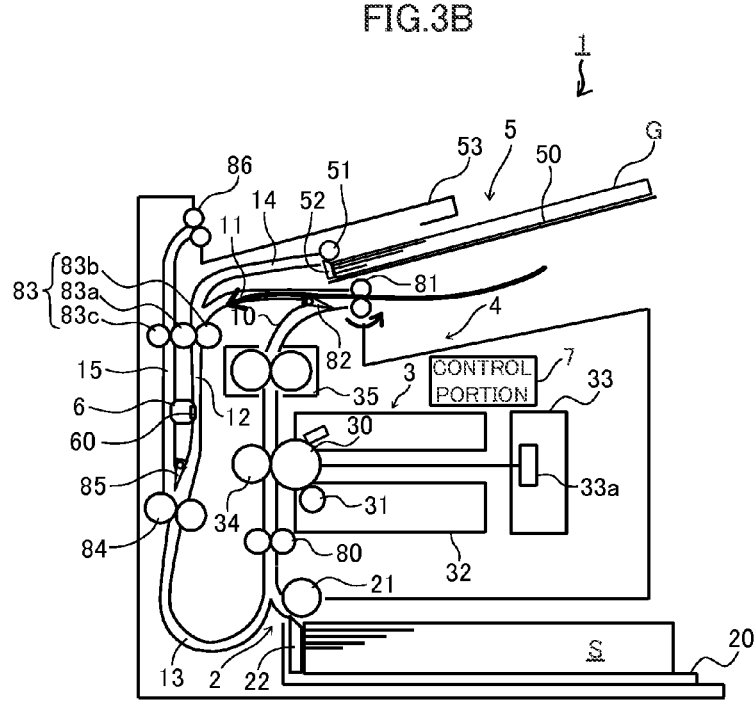

IMAGE FORMING APPARATUS

BACKGROUND OF THE INVENTION

1. Field of the Invention

The present invention relates to an image forming apparatus which includes an image reading device which can read an image on a document.

2. Description of the Related Art

In general, an image forming apparatus which includes an image reading device which reads an image on a document while feeding the document includes a document conveying path for conveying the document to an image reading portion, and a sheet conveying path for conveying a sheet to an image forming portion. For this reason, when performing duplex reading of a document, or duplex printing of a sheet, it is necessary to provide a duplex conveying path for respectively conveying the document or the sheet by reversing thereof, in a document conveying path and a sheet conveying path. Due to this, when making reading of both sides of the document or duplex printing of a sheet possible, there is a problem in that the image forming apparatus becomes large.

In contrast to this, an image forming apparatus which is downsized while making reading of double-sides of the document and duplex printing of a sheet possible, by arranging an image reading portion in a duplex conveying path of the sheet, and causing the duplex conveying path of the sheet and a document conveying path to be shared has been proposed in JP-A-2006-232467.

However, in the image forming apparatus which is described in JP-A-2006-232467, when a first face (front surface) of a document is read in the duplex conveying path, the document is switched back after passing through the sheet conveying path, and a second face (rear surface) thereof is read by being sent to the duplex conveying path again.

That is, when the double-sides of the document are read, there has been a concern that the document may get dirty, or may be damaged when the document passes through a transfer portion or a fixing portion which is arranged in the sheet conveying path.

SUMMARY OF THE INVENTION

According to an aspect of the present invention, there is provided an image forming apparatus including a sheet feed portion configured to feed a sheet, an image forming portion configured to form an image on the sheet which is fed from the sheet feed portion at an image forming position, a sheet discharging portion configured to discharge the sheet on which the image is formed by the image forming portion, a first conveying path which connects between the sheet feed portion and the sheet discharging portion, and on which the image forming portion is arranged, a second conveying path configured to guide the sheet on which the image has been formed on one surface thereof by the image forming portion to the first conveying path again, a document feed portion configured to feed a document, a document discharging portion configured to discharge the document which is fed from the document feed portion, a document conveying path including a document feeding path which is connected to the document feed portion, a document discharging path which is connected to the document discharging portion, and a common conveying path which serves as at least a part of the second conveying path, and guiding the document from the document feed portion to the document discharging portion through the document feeding path, the common conveying path and the document discharging path without causing the document to pass through the image forming position, and a reading portion configured to read a first face and a second face of the document fed from the document feed portion during when the document is conveyed through the document conveying path.

Further features of the present invention will become apparent from the following description of exemplary embodiments with reference to the attached drawings.

BRIEF DESCRIPTION OF THE DRAWINGS

FIG. 3A is a cross-sectional view which illustrates a movement of a sheet which is fed to a sheet conveying path from a feeding tray in an image forming operation of the printer according to the first embodiment.

FIG. 3B is a cross-sectional view which illustrates a movement of the sheet which is switched back by a pair of discharging rollers in the image forming operation of the printer according to the first embodiment.

DESCRIPTION OF THE EMBODIMENTS

Hereinafter, an image forming apparatus according to embodiments of the present invention will be described with reference to drawings. The image forming apparatus according to the embodiment of the present invention is an image forming apparatus which includes an image reading device which can read image information of a document such as a copy machine, a printer, a fax machine, and a multifunction machine thereof.

In the following embodiments, an electro-photography type laser beam printer (hereinafter, referred to as "printer") will be used for descriptions as an image forming apparatus.

First Embodiment

A printer 1 according to a first embodiment of the present invention will be described with reference to FIGS. 1 to 6B. First, a schematic configuration of the entire printer 1 according to the first embodiment will be described with reference to FIGS. 1 and 2.

Figure 1:
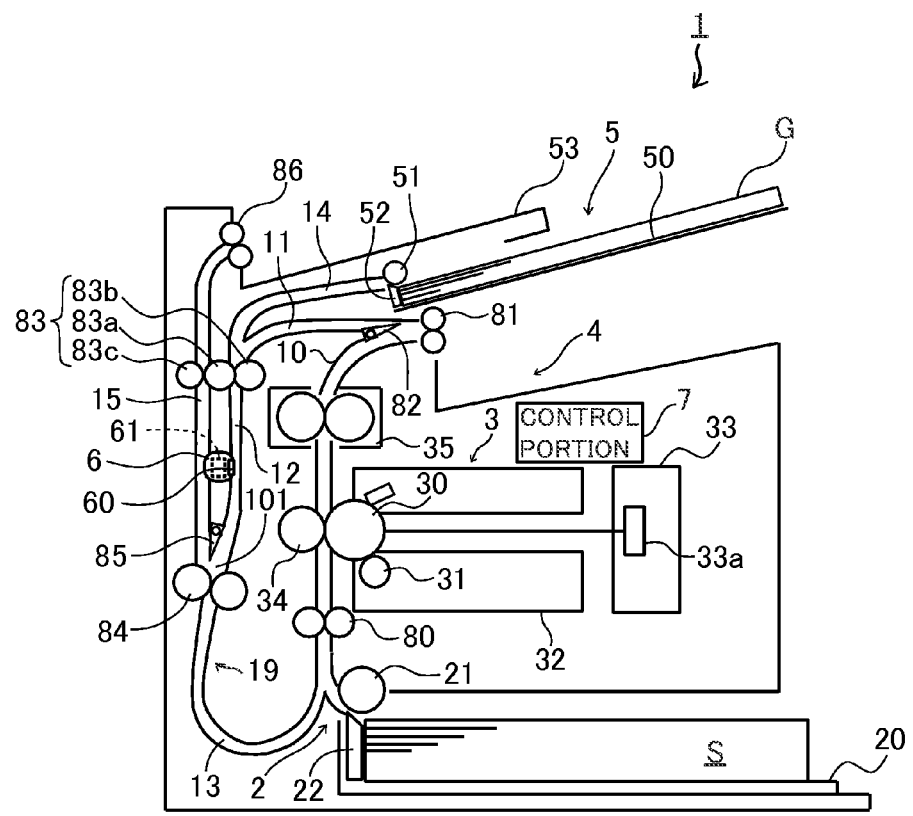
FIG. 1 is a cross-sectional view which schematically illustrates a printer according to a first embodiment of the present invention.

As illustrated in FIG. 1, the printer 1 includes a sheet feed portion 2 which is located at the lower part of the printer 1, an image forming portion 3 which is located at the upper part of the sheet feed portion 2, and a discharged sheet stacking portion 4 which is located at the upper part of the printer 1. A sheet on which an image is formed in the image forming portion 3 by a pair of discharging rollers (sheet discharging portion) 81 is discharged to the discharged sheet stacking portion 4. In addition, the printer 1 includes a document feed portion 5 which is located at the upper part of the printer 1, a discharged document stacking portion 53 which is located at the upper part of the printer 1, an image reading portion (reading portion) 6 which is located downstream in the document feeding direction of the document feed portion 5, and at the side of the printer 1, and a control portion 7. All of the pair of sheet discharging rollers 81, the document feed portion 5, and a pair of discharging rollers 86 are arranged at the upper part of the image forming portion 3.

The printer 1 further includes a sheet conveying path (first conveying path) 10 which connects the sheet feed portion 2 and the pair of discharging rollers 81 therebetween, and on which the image forming portion 3 is arranged on a path between the sheet feed portion 2 and the pair of discharging rollers 81, a reverse conveying path 11 which is connected to the downstream of the sheet conveying path 10 in the sheet conveyance direction, and a common conveying path 12 which is connected to a downstream end of the reverse conveying path 11. In addition, the printer 1 includes a U-turn conveying path 13 which connects the downstream end of the common conveying path 12 and the upstream of the sheet conveying path 10 in the sheet conveyance direction, and a document feeding path 14 which connects the document feed portion 5 and an upstream end of the common conveying path 12. In addition, the printer 1 includes the pair of discharging rollers 86 which discharges the document which is fed from the document feed portion 5 to the discharged document stacking portion 53. The printer 1 includes a document discharging path 15 which connects a connection portion 101 which connects the common conveying path 12 and the U-turn conveying path 13, and the pair of discharging rollers (document discharging portion) 86.

For this reason, according to the embodiment, due to the reverse conveying path 11, the common conveying path 12, and the U-turn conveying path 13, a duplex conveying path (second conveying path) 19 which connects the upstream side and the downstream side of the image forming portion 3 of the sheet conveying path 10 in the sheet conveyance direction by bypassing the image forming portion 3 is configured. Due to the duplex conveying path 19, a sheet on which an image is formed on a first face by the image forming portion 3 is guided to the upstream side of the image forming portion 3 of the sheet conveying path 10 in the sheet conveyance direction in a state in which an image can be formed on a second face which is opposite to the first face. In addition, due to the document feeding path 14, the document discharging path 15, the common conveying path 12, and the like, a document conveying path 100 which conveys the document which is fed from the document feeding path 14 to a document discharging path 15 through the common conveying path 12 is formed. It will be described in detail later, however, any one of the first and second faces of the document is guided so as to face a reading sensor 61 (refer to FIG. 2) of the image reading portion 6 on a conveying path between the document feed path 14 and the document discharging path 15 by the document conveying path 100.

The sheet feed portion 2 includes a feeding tray 20 which stacks sheets S, a feeding roller 21 which feeds the sheet S on the feeding tray 20, and a separation portion 22 in which a separation pad for separating sheets S which are fed by the feeding roller 21 one by one is arranged on a top face.

The image forming portion 3 includes a process cartridge 32 which is configured by integrating an image forming process portion such as a photoconductive drum 30, or a developing sleeve 31, and an exposure device 33 which radiates laser beam to the photoconductive drum 30 based on image information. In addition, the image forming portion 3 includes a transfer roller 34 which transfers a toner image which is formed on the photoconductive drum 30 at a transfer position (image forming position) to the sheet S, and a fixing portion 35 which fixes the toner image which is transferred to the sheet S.

The document feed portion 5 feeds a document from a document tray 50 in which a document G which is fed is stacked. The document feed portion 5 includes a pickup roller 51 which sends out the documents G which are stacked in the document tray 50 with the front surface (first face) up one by one sequentially, and a separation portion 52 in which a separation pad for separating the documents G which are fed by the pickup roller 51 one by one is arranged on a top face.

The image reading portion 6 includes one reading sensor 61 (refer to FIG. 2), and a reading portion cover 60 which is configured of a transmission member such as glass.

The reading sensor 61 is provided inside the image reading portion 6. The reading portion cover 60 is provided so as to face the reading sensor 61, and prevents foreign substances from being mixed inside the image reading portion 6. The image reading portion 6 reads an image of the document G which passes through by facing the reading portion cover 60 using the reading sensor 61 which is provided inside. In addition, the image reading portion 6 is provided between the common conveying path 12 and the document discharging path 15 of which at least a part is provided so as to be parallel with the common conveying path 12 (conveying path on one side), and the reading sensor 61 is provide so as to move between a first position at which an image of the document G which passes through the common conveying path 12 is read and a second position at which the image of the document G which passes through the document discharging path 15 is read. According to the embodiment, the reading sensor 61 moves when the image reading portion 6 rotates by 180° around a rotating shaft which is not shown.

The sheet conveying path 10 passes through a transfer nip and the fixing portion 35 which is configured of the photoconductive drum 30 and the transfer roller 34 from the sheet feed portion 2, and extends to the upper part toward the pair of discharging rollers 81. A pair of conveying rollers 80 is provided between the sheet feed portion 2 of the sheet conveying path 10 and the image forming portion 3. The pair of conveying rollers 80 conveys the sheet S on the sheet conveying path 10. The pair of discharging rollers 81 which configures means for reversing a sheet, and can perform a normal rotation and a reverse rotation is provided on the downstream end of the sheet conveying path 10 in the sheet conveyance direction. The pair of discharging rollers 81 discharges the sheet S to the discharged sheet stacking portion 4 by performing a normal rotation, and conveys the sheet S to the reverse conveying path 11 by performing a reverse rotation when printing an image on double-side of the sheet S. In addition, a first switching member 82 which configures the means for reversing a sheet is provided at a branching portion of the sheet conveying path 10 and the reverse conveying path 11. The first switching member 82 guides the sheet S which moves on the sheet conveying path 10 to the a discharged sheet stacking portion 4, and guides the sheet S which is reversed by the pair of discharging rollers 81 to the reverse conveying path 11 when images are printed on double-side of the sheet S. The reverse conveying path 11 extends toward the side substantially horizontally.

The common conveying path 12 is connected to the document feeding path 14 at the upstream end (one end) in the document conveyance direction, extends downward, and guides the sheet S downward. A triple roller for double-side conveyance 83 is provided on the upstream side of the common conveying path 12 in the sheet conveyance direction. The triple roller for double-side conveyance 83 is configured of a driving roller 83a, and rollers 83b and 83c which are provided on double-side of the driving roller 83a, and is configured as a triple roller in which the double-side of the driving roller 83a are nipped with a predetermined pressure using the rollers 83b and 83c. That is, the driving roller 83a is arranged between the document discharging path 15 and the common conveying path 12, and becomes a rotating roller which forms a pair with the roller 83b which is provided on the common conveying path side, and the roller 83c which is provided on the document discharging path side, respectively. The triple roller for double-side conveyance 83 can convey the sheet S and the document G which are guided to the common conveying path 12 to the downstream side in the sheet conveyance direction (downward direction in FIG. 1), that is, toward the image reading portion 6 (reading sensor 61) by rotatably driving the driving roller 83a in the first direction (clockwise). In addition, the triple roller for double-side conveyance 83 can convey the document G which is guided to the document discharging path 15 to the downstream side in the document discharging direction which is opposite to the document G feeding direction (upward direction in FIG. 1), that is, toward the pair of discharging rollers 86, on the document discharging path 15 by rotatably driving the driving roller 83a in the second direction (counterclockwise).

A second switching member 85 as a switching member is provided at the branching portion of the common conveying path 12 and the document discharging path 15. The second switching member 85 guides the sheet S or the document G which moves on the common conveying path 12 to the U-turn conveying path 13. In addition, the second switching member 85 guides the document G which moves on the U-turn conveying path 13 in a direction opposite to the document feeding direction to the document discharging path 15.

The U-turn conveying path 13 extends downward and makes a U-turn toward the sheet conveying path 10 at a lower end portion. A pair of rollers for double-side conveyance (pair of rollers for reversing document) 84 which can perform a normal rotation and a reverse rotation is provided on the U-turn conveying path 13.

That is, the pair of rollers for double-side conveyance 84 is arranged on the downstream side of a merge portion (connection portion) 101 between the document discharging path 15 and the common conveying path 12 in the document conveyance direction, conveys the sheet S or the document G to the U-turn conveying path 13 by performing a normal rotation, and conveys the document G to the document discharging path 15 by performing a reverse rotation. The document discharging path 15 extends upward substantially in parallel with the common conveying path 12. A pair of discharging rollers 86 is provided on the downstream end of the document discharging path 15. The pair of discharging rollers 86 discharges the document G to the discharged document stacking portion 53.

In addition, according to the embodiment, the U-turn conveying path 13 and the common conveying path 12 are described as separate conveying paths for convenience of descriptions; however, since the document is conveyed on the U-turn conveying path 13, when performing a switching back conveyance which will be described later, the U-turn conveying path also configures a part of a document conveying path 100, and becomes the common conveying path since it is a portion which overlaps with the duplex conveying path 19 and with the document conveying path 100.

Figure 2:
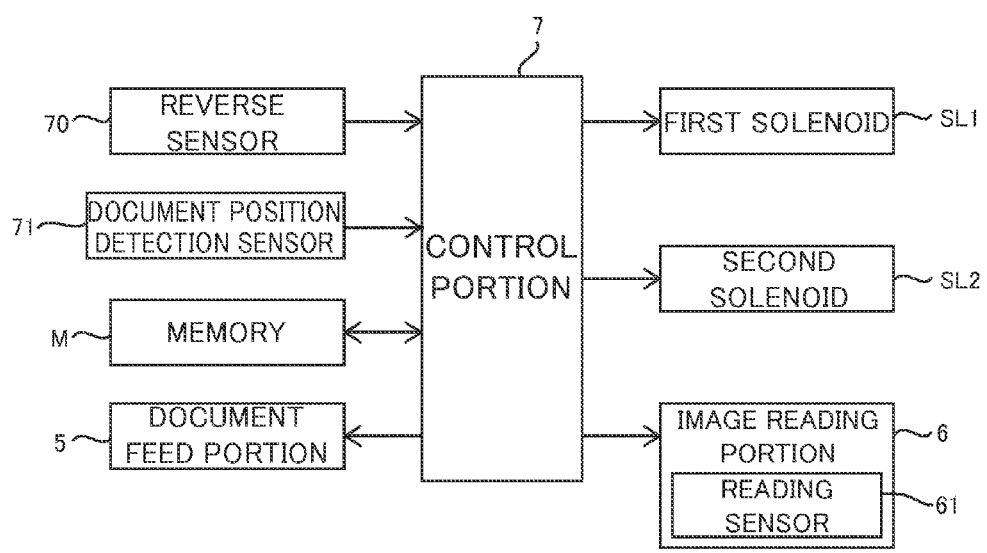
FIG. 2 is a block diagram which illustrates a configuration of a control portion of the printer according to the first embodiment.

As illustrated in FIG. 2, the control portion 7 is connected with a first solenoid SL1 which drives the first switching member 82, a second solenoid SL2 which drives the second switching member 85, a reverse sensor 70 which will be described later, the image reading portion 6, and the document feed portion 5. In addition, the control portion 7 is connected with a document position detection sensor 71 which will be described later, and a memory M which stores image information of the document G which is read by the image reading portion 6.

Subsequently, an image forming operation (simplex printing and duplex printing) using the printer 1 which is configured as described above will be described with reference to FIGS. 3A to 4B.

When the image forming operation is started, first, a feeding roller 21 rotates due to a feeding start signal from the control portion 7. Due to this, the feeding roller 21 sends out sheets S on the feeding tray 20. The sent out sheets S are separated into each sheet by a separation portion 22, and is conveyed toward the image forming portion 3 using the pair of conveying rollers 80. In addition, when a sheet end sensor (not shown) detects the sheet S, a light emitting portion 33a which is provided in the exposure device 33 radiates laser beam to the photoconductive drum 30 based on image information.

When the image forming operation is started, the photoconductive drum 30 rotates, and the surface of the photoconductive drum 30 is equally charged so as to have a predetermined polarity, and a predetermined potential using a charging roller. In addition, when laser beam is radiated to the photoconductive drum 30 of which the surface is charged, an electrostatic latent image is formed on the photoconductive drum 30. In addition, the electrostatic latent image is visualized as a toner image by being developed using toner which is supplied from the developing sleeve 31.

When the sheet S reaches the transfer nip between the photoconductive drum 30 and the transfer roller 34, a toner image is transferred onto the first face of the sheet S by an applied bias and a pressure, which are applied to the transfer roller 34. In addition, when the toner image is transferred onto the first face of the sheet S, the sheet S is conveyed to the fixing portion 35, and heat and a pressure are added to the sheet in the fixing portion 35. In this manner, the toner image is fixed onto the first face. As illustrated in FIG. 3A, the sheet S on which the toner image is fixed is discharged onto the discharged sheet stacking portion 4 using the pair of discharging rollers 81 thereafter. The sheet S which is discharged onto the discharged sheet stacking portion 4 is sequentially stacked on the discharged sheet stacking portion 4. In this manner, the image forming operation for simplex printing ends.

In contrast, when images are formed on double-sides of the sheet S, if the reverse sensor 70 (refer to FIG. 2) detects that the rear end of the sheet S has passed through the branch portion of the sheet conveying path 10 and the reverse conveying path 11, the control portion 7 causes the pair of discharging rollers 81 to rotate in reverse.

In addition, the control portion 7 drives the first solenoid SL1, rotationally moves the first switching member 82 clockwise which is provided at the branching portion, and switches the conveyance direction of the sheet S. Due to the switchback convey by the pair of discharging rollers 81, the sheet S on which an image is formed on the first face is guided to the reverse conveying path 11 in the substantially horizontal direction by having the current rear end side as a leading end, and enters the common conveying path 12 as illustrated in FIG. 3B.

Figure 4A:
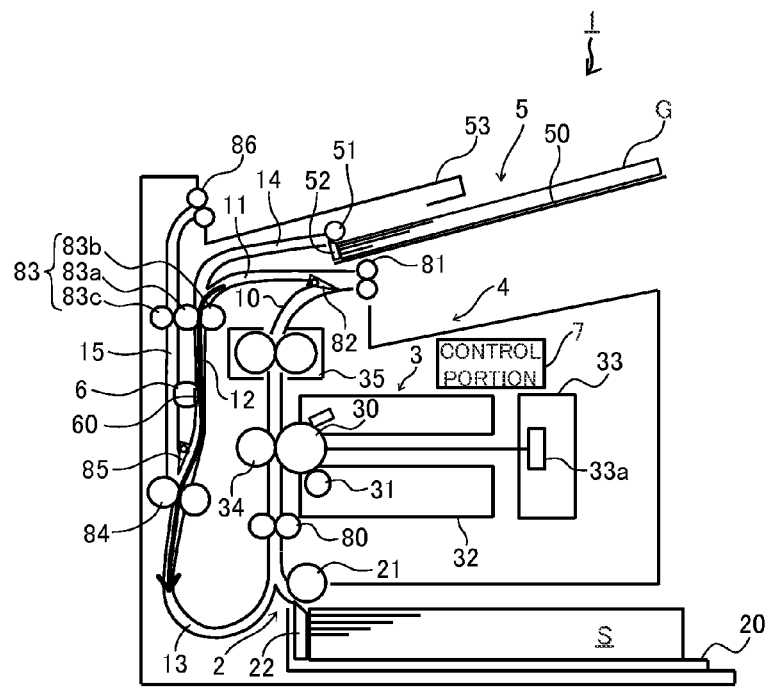
FIG. 4A is a cross-sectional view which illustrates a movement of the sheet which is conveyed to a U-turn conveying path in the image forming operation of the printer according to the first embodiment.
Figure 4B:
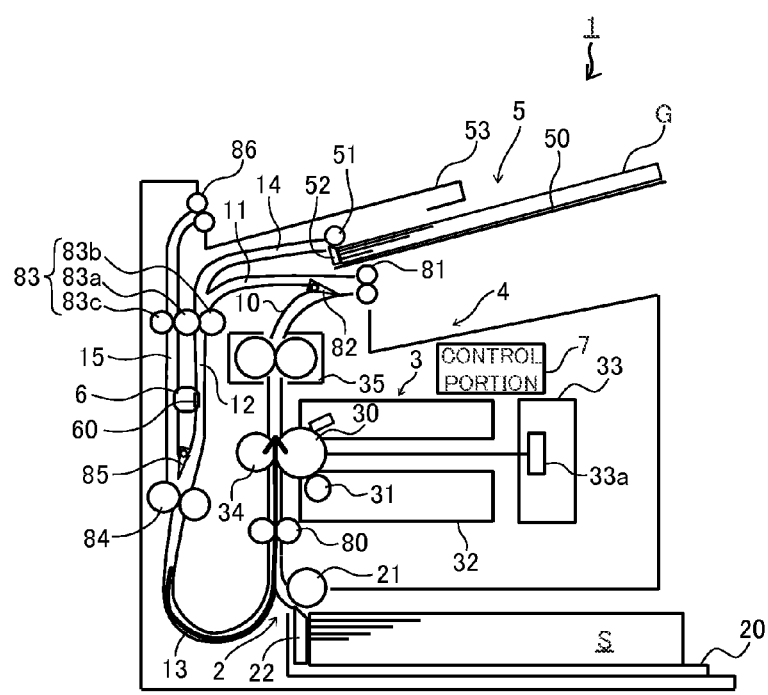
FIG. 4B is a cross-sectional view which illustrates a movement of the sheet which joins the sheet conveying path from the U-turn conveying path in the image forming operation of the printer according to the first embodiment.

As illustrated in FIG. 4A, the sheet S which has entered the common conveying path 12 is conveyed downward along the common conveying path 12 by the driving roller 83a and the roller 83b, and joins the U-turn conveying path 13. As illustrated in FIG. 4B, the sheet S which has joined the U-turn conveying path 13 makes a U-turn along the U-turn conveying path 13 due to the pair of rollers for double-side conveyance 84, and joins the sheet conveying path 10 between the sheet feed portion 2 and the image forming portion 3. In this manner, the sheet S is guided again by the pair of conveying rollers 80 in a state in which the front side is turned to the rear side, and an image is formed on the second face thereof due to the same operation as that of forming the image on the first face. The sheet S on which images are formed on both sides (first face and second face) is discharged to the discharged sheet stacking portion 4 by the pair of discharging rollers 81. In this manner, the image forming operation of duplex printing is ended.

Subsequently, an image reading operation (double-sided reading) of the printer 1 which is configured as described above will be described with reference to FIGS. 5A to 6B.

Figure 5A:
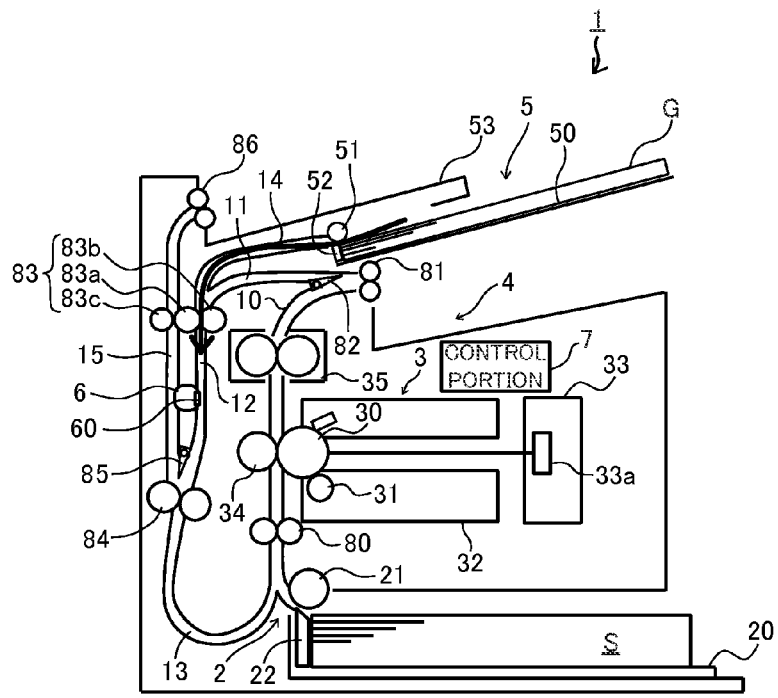
FIG. 5A is a cross-sectional view which illustrates a movement of a document conveyed to a common conveying path in the image reading operation of the printer according to the first embodiment.

When reading an image on the documents G, the documents G are sent out one by one by rotating the pickup roller 51, are separated one by one by the separation portion 52, and are fed to the document feeding path 14. The document G which is fed to the document feeding path 14 is conveyed downstream (downward) in the document feeding direction along the common conveying path 12 using the driving roller 83a and the roller 83b, as illustrated in FIG. 5A. At this time, the image reading portion 6 moves to the first position at which an image of the document G which passes through the common conveying path 12 is read. In this manner, when the document G passes through the image reading portion 6, an image on the first face of the document G is read.

The read image information is stored in the memory M (refer to FIG. 2) as image information on the first face of the document G.

Figure 5B:
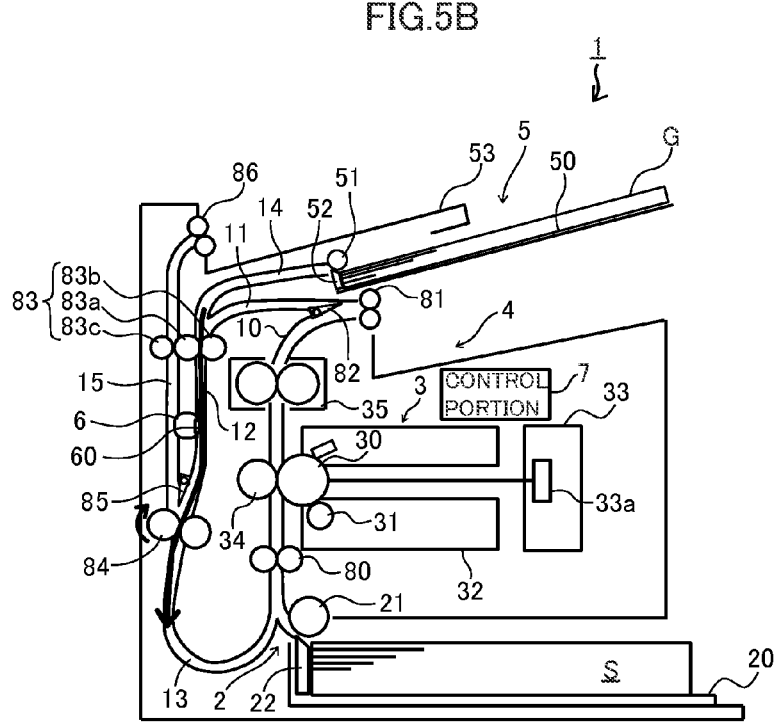
FIG. 5B is a cross-sectional view which illustrates a movement of the document conveyed to the U-turn conveying path in the image reading operation of the printer according to the first embodiment.

As illustrated in FIG. 5B, the document G which has passed through the image reading portion 6 is guided to the U-turn conveying path 13 using the second switching member 85, and is conveyed to the U-turn conveying path 13 using the pair of rollers for double-side conveyance 84. When a document position detection sensor 71 (refer to FIG. 2) detects that the rear end of the document G of which the image on the first face is read has passed through the second switching member 85, the control portion 7 rotates the pair of rollers for double-side conveyance 84 in reverse. In addition, the control portion 7 rotationally moves the second switching member 85 which is provided at the branching portion counterclockwise by driving the second solenoid SL2, and switches the document G so as to face the document discharging path 15. In this manner, the document G is switched back, and is conveyed toward the document discharging path 15.

Here, a sum of the length of the merge portion of the duplex conveying path 19 between the second switching member 85 and the sheet conveying path 10, and the length of the sheet conveying path 10 between the above-described merge portion and the image forming portion 3 (transfer nip) is formed so as to be longer than the maximum length of the document which can be fed by the document feed portion 5.

Figure 6A:
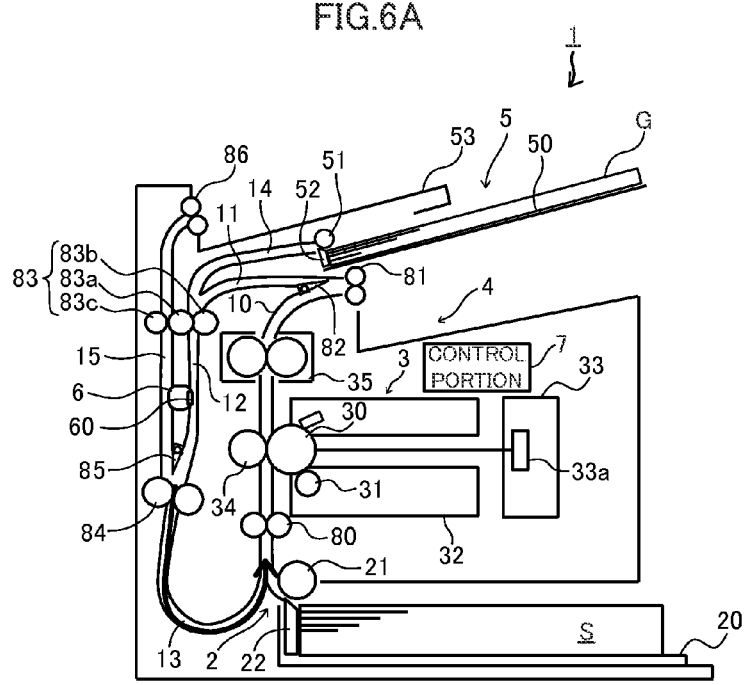
FIG. 6A is a cross-sectional view which illustrates a movement of a document of which the rear end has passed through a second switching member in the image reading operation of the printer according to the first embodiment.

As illustrated in FIG. 6A, according to the embodiment, the length of the U-turn conveying path 13 is set so that the leading end of the document G which is conveyed to the U-turn conveying path 13 comes to upstream in the sheet conveyance direction of the pair of conveying rollers 80. For this reason, the document G can be switched back without passing through the transfer roller 34 or the fixing portion 35. When the document G passes through the transfer nip or the fixing portion 35, there is a concern that the document G may become dirty with toner, or the document G may be damaged due to heat or a pressure of the fixing portion 35. However, according to the embodiment, since the leading end of the document G does not reach the transfer nip or the fixing portion 35, there is no risk of that, and it is possible to more clearly read both sides of the document G.

Figure 6B:
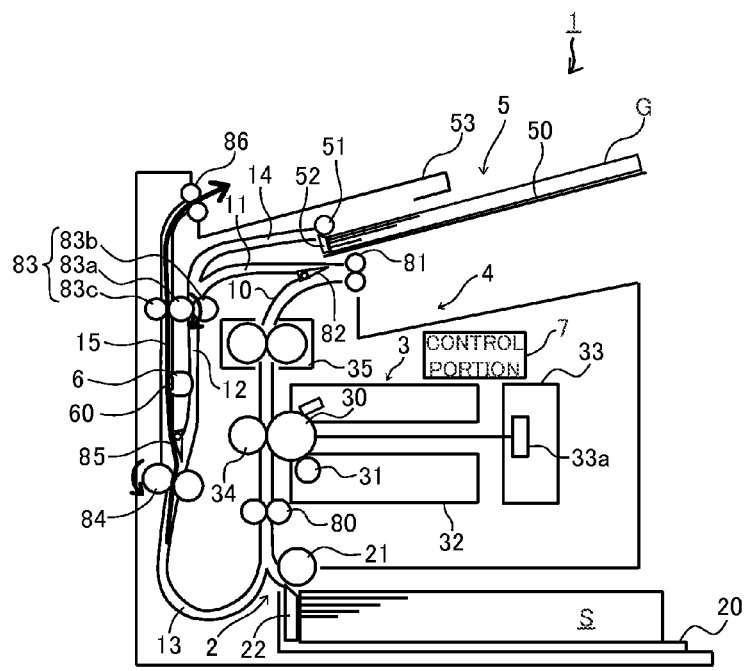
FIG. 6B is a cross-sectional view which illustrates a movement of the document which is guided to a document discharging path by being switched back in the image reading operation of the printer according to the first embodiment.

When the document G is switched back, the image reading portion 6 is moved from the first position at which the image on the document G which passes through the common conveying path 12 is read to the second position at which the image on the document G which passes through the document discharging path 15 is read. As illustrated in FIG. 6B, according to the embodiment, the image reading portion 6 is rotated by 180° around the rotating shaft of the image reading portion 6 so that the reading portion cover 60 side faces the document discharging path 15. In this manner, when the document G passes through the document discharging path 15, the image on the second face of the document G is read. The read image information is stored in the memory M (refer to FIG. 2) as image information on the second face of the document G.

The document G which has passed through the image reading portion 6 is conveyed upward toward the pair of discharging rollers 86 along the document discharging path 15 using the driving roller 83a and the roller 83c. The document G which is conveyed on the document discharging path 15 is discharged to the discharged document stacking portion 53 using the pair of discharging rollers 86 which is provided on the downstream end of the document discharging path 15, and is stacked onto the discharged document stacking portion 53.

In this manner, the document which is fed can be conveyed to the pair of discharging rollers 86 without passing through a transfer position (image forming position) of an image by means for conveying a document including the pair of rollers for double-side conveyance 84 or the document discharging path 15.

In addition, when reading of the document G is ended, the image reading portion 6 is rotated by 180° in readiness for the subsequent document, and moves again to the first position at which an image of the document G which passes through the common conveying path 12 is read. In addition, it is also possible to control the image reading portion 6 so as not to move when a user selects a single side reading mode arbitrarily.

Here, when a user selects a copy mode, the above described image forming operation is executed based on the image information which is stored in the memory M. In addition, when the copy mode is not selected, it is also possible to transmit the image information stored in the memory M to an external computer as electronic data.

As described above, the printer 1 according to the first embodiment can be downsized as a printer 1 which is provided with a function of reading double-sides of the document G by providing the common conveying path 12 and the U-turn conveying path 13 which can convey the sheet S and the document G. In addition, when downsizing the printer, it is possible to convey the document G to the image reading portion 6 again without causing the document to pass through the image forming position (transfer position) of the image forming portion 3, by reversing the document in the U-turn conveying path 13. For this reason, when reading images on both sides of the document G, it is possible to prevent the document G from getting dirty. In addition, according to the embodiment, since it is possible to convey the document without causing the document to pass through the fixing portion 35 when reading the images on double-sides of the document G, it is possible to prevent the document G from being damaged. In this manner, it is possible to realize a downsized printer, and to perform double-sided reading without causing the document to be damaged.

In addition, a rotating reading portion is exemplified as the image reading portion 6; however, the image reading portion may have a form including two reading sensors.

That is, for example, it may be a configuration in which a first reading sensor which is provided on the common conveying path 12, and a second reading sensor which is provided on the document discharging path 15 and reads a face on the side opposite to a face of the document which is read by the first reading sensor are provided. In addition, in the invention of the present application, the document can be conveyed without passing through the image forming position when reading images on double-sides of the document; however, the invention is not limited to an apparatus in which the document does not pass through the image forming position at all. For example, it may be an apparatus in which a special mode of discharging the document to the discharged sheet stacking portion 4 after reading an image, or forming an image on the document can be executed, and when such a special mode is executed, the document is allowed to pass through the image forming position.

Second Embodiment

Subsequently, a printer 1A according to a second embodiment will be described with reference to FIGS. 7 to 9.

The printer 1A according to the second embodiment is different from the printer 1 according to the first embodiment in that the printer 1A includes a reverse conveying path 16 which is connected to a downstream end of a common conveying path 12.

For this reason, in the second embodiment, the difference from the first embodiment, that is, the reverse conveying path 16, will be mainly described, and the same constituent elements as those of the printer 1 according to the first embodiment will be given the same reference numerals, and descriptions thereof will be omitted.

First, a schematic configuration of the entire printer 1A according to the second embodiment will be described with reference to FIG. 7.

Figure 7:
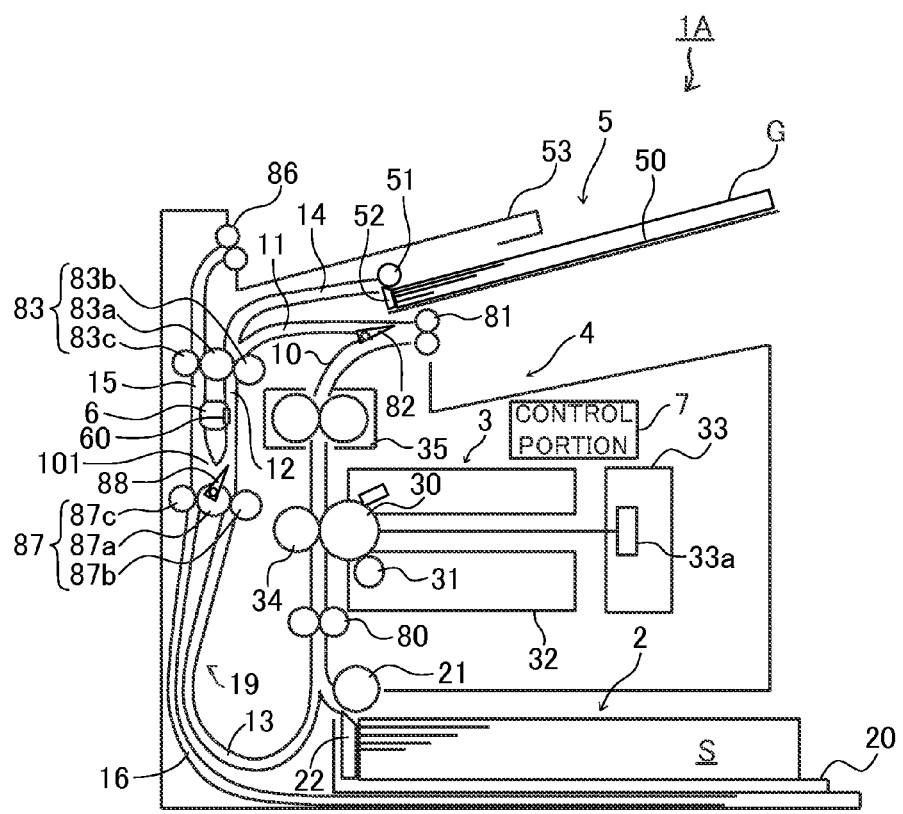
FIG. 7 is a cross-sectional view which schematically illustrates a printer according to a second embodiment of the present invention.

As illustrated in FIG. 7, the printer 1A includes a sheet feed portion 2, an image forming portion 3, a discharged sheet stacking portion 4, a document feed portion 5, a discharged document stacking portion 53, an image reading portion 6, and a control portion 7. In addition, the printer 1A includes a sheet conveying path 10 (first conveying path), a reverse conveying path 11, a common conveying path 12, a U-turn conveying path 13, a document feeding path 14, a document discharging path 15, and a reverse conveying path 16.

In addition, similarly to the first embodiment, the reverse conveying path 11, the common conveying path 12, and the U-turn conveying path 13 configure a duplex conveying path 19 (second conveying path). In addition, a document conveying path 100 is formed by the document feeding path 14, the document discharging path 15, the common conveying path 12, the reverse conveying path 16, and the like.

The common conveying path 12 and the document discharging path 15 are arranged on the upper side of the reverse conveying path 16, and the reverse conveying path joins the common conveying path 12 and the document discharging path 15 at a merge portion 101. In addition, the reverse conveying path 16 extends downward substantially in parallel with the U-turn conveying path 13, and then extends toward the lower part of the sheet feed portion 2 by being bent in the downstream end, and guides the document G which moves on the common conveying path 12 downward without causing the document to enter the U-turn conveying path 13.

A triple roller for double-side conveyance 87 is provided upstream of the reverse conveying path 16 in the document feeding direction. The triple roller for double-side conveyance 87 is configured of a driving roller (rotating roller) 87a, and rollers 87b and 87c which are provided at double-sides of the driving roller 87a, and has a configuration of a triple roller in which the roller 87b which is provided on the second conveying path side and the roller 87c which is provided on the reverse conveying path side nip double-sides of the driving roller 87a with a predetermined pressure. The triple roller for double-side conveyance 87 can convey the sheet S downstream in the sheet conveyance direction (downward direction in FIG. 1) in the U-turn conveying path 13 by driving the driving roller 87a normally. In addition, the triple roller for double-side conveyance 87 can convey the document G which is guided to the reverse conveying path 16 by driving the driving roller 87a normally to the downstream side in the document discharging direction (upward direction in FIG. 1) which is a direction opposite to the document feeding direction. In addition, the triple roller for double-side conveyance 87 can convey the document G downstream in the document feeding direction (downward direction in FIG. 1) in the reverse conveying path 16 by driving the driving roller 83a reversely. That is, the triple roller for double-side conveyance 87 is arranged on the downstream side of the branching portion of the common conveying path 12 and the document discharging path 15 in the document feeding direction, and becomes a document reverse conveyance portion which is configured so as to convey the document by reversing the conveyance direction of the document which is fed from the document feed portion 51.

A third switching member 88 as a switching member is provided at the branching portion of the reverse conveying path 16 and the U-turn conveying path 13. The third switching member 88 guides a sheet S to the U-turn conveying path 13 when the sheet S moves on the common conveying path 12, and guides the document G on the reverse conveying path 16 when the document G moves on the common conveying path 12. In addition, when the document G is switched back by the driving roller 87a and the roller 87c, the third switching member 88 guides the document G to the document discharging path 15. In addition, the third switching member 88 is connected to a third solenoid (not shown), and driving of the third solenoid is controlled by the control portion 7.

Subsequently, an image reading operation (double-sided reading) of the printer 1A which is configured as described above will be described with reference to FIGS. 8A to 9. In addition, since an image forming operation (simplex printing and duplex printing) using the printer 1A is the same as that in the first embodiment, descriptions thereof will be omitted here. In addition, since up to reading of the first face of the document G is the same as that in the first embodiment, hereinafter, operations of the document G after being read on the first face will be described.

Figure 8A:
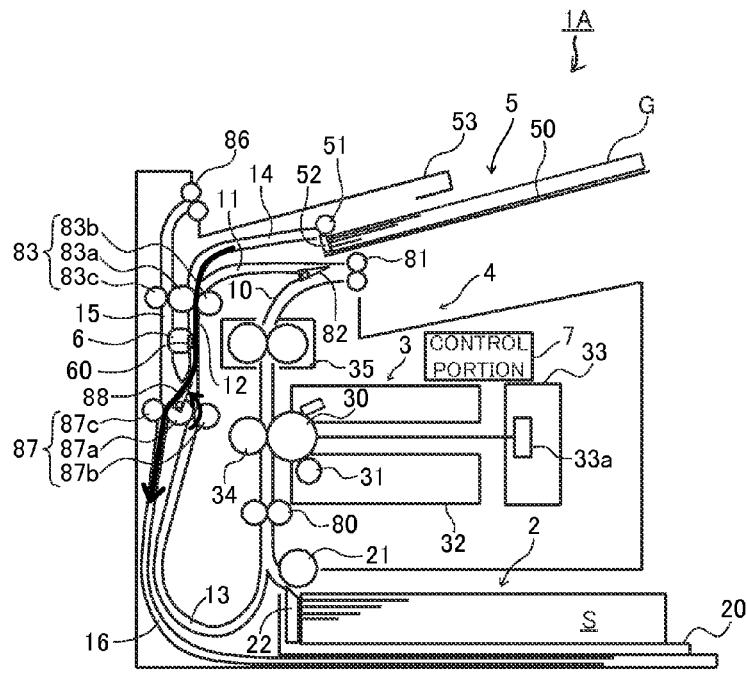
FIG. 8A is a cross-sectional view which illustrates a movement of a document which is guided to a reverse conveying path in an image reading operation of the printer according to the second embodiment.
Figure 8B:
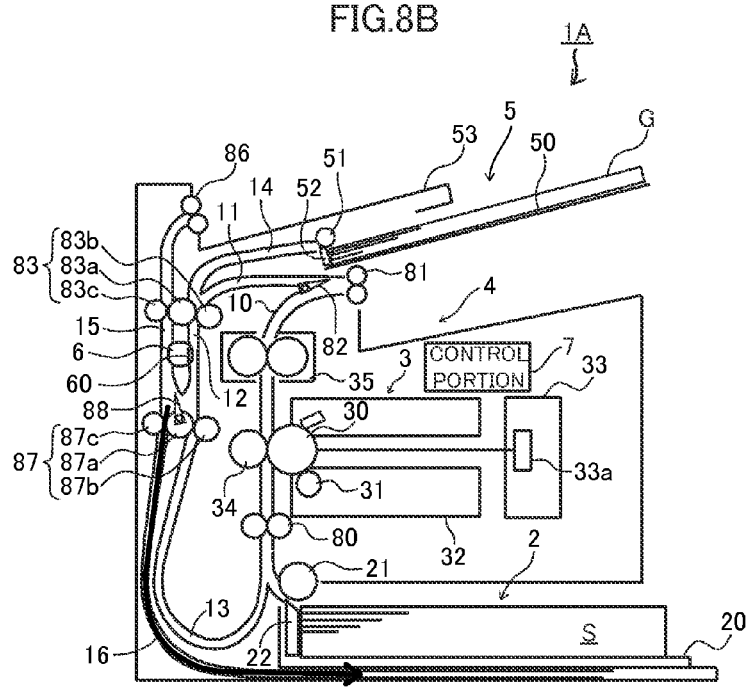
FIG. 8B is a cross-sectional view which illustrates a movement of the document of which the rear end has passed through a third switching member in the image reading operation of the printer according to the second embodiment.
Figure 9:
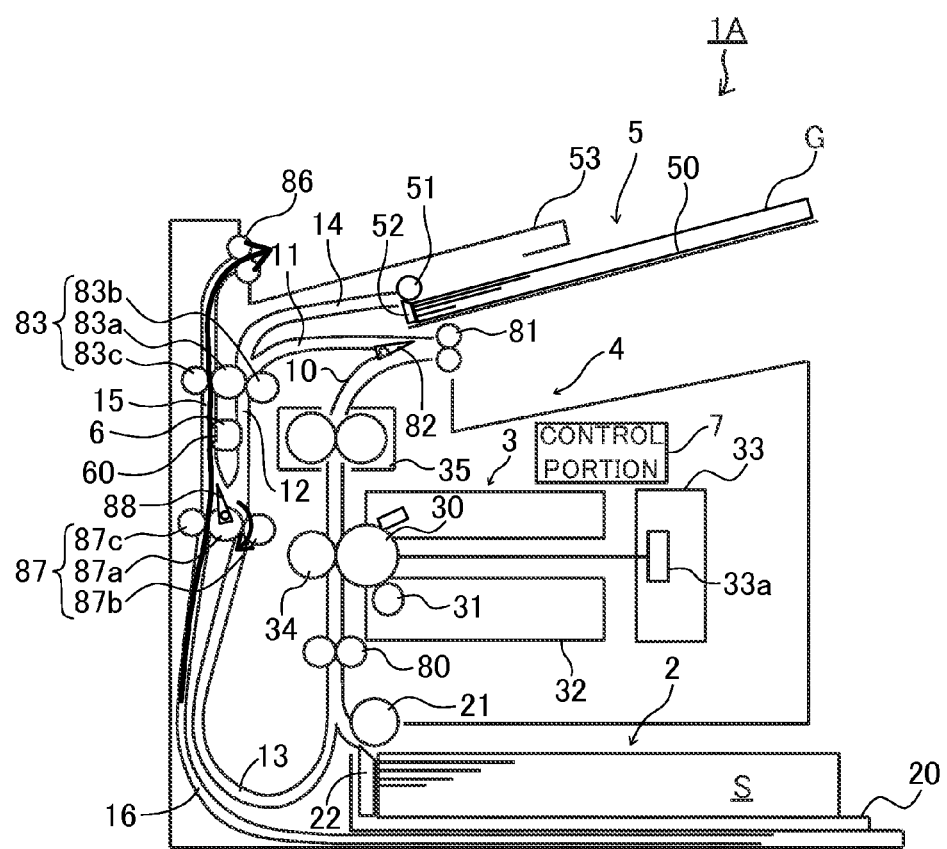
FIG. 9 is a cross-sectional view which illustrates a movement of the document which is guided to a document discharging path by being switched back in the image reading operation of the printer according to the second embodiment.

As illustrated in FIG. 8A, the document G which has passed through the image reading portion 6 is guided to the reverse conveying path 16 using the third switching member 88, and is conveyed to the reverse conveying path 16 using the driving roller 87a and the roller 87c. When the document position detection sensor 71 (refer to FIG. 2) detects that the rear end of the document G of which an image on the first face is read has passed through the third switching member 88, the control portion 7 causes the driving roller 87a to rotate reversely. In addition, the control portion 7 switches the conveyance direction of the document G by driving the third solenoid (not shown), and by rotationally moving counterclockwise the third switching member 88 which is provided at the branching portion. In this manner, the document G is switched back, and is conveyed toward the document discharging path 15. In addition, as illustrated in FIG. 8B, the length of the reverse conveying path 16 is formed so as to be longer than the maximum length of the document which can be fed from the document feed portion 5.

When the document G is switched back, the image reading section 6 is moved from the first position at which the image on the document G which passes through the common conveying path 12 is read to the second position at which the image on the document G which passes through the document discharging path 15 is read. According to the embodiment, the image reading portion 6 is rotated by 180° around a rotating shaft of the image reading portion 6 so that the reading portion cover 60 side faces the document discharging path 15. In this manner, as illustrated in FIG. 9, when the document G passes through the document discharging path 15, the image on the second face of the document G is read. The read image information is stored in the memory M (refer to FIG. 2) as image information on the second face of the document G. Since operations thereafter are the same as those in the first embodiment, descriptions thereof will be omitted. In this manner, it is possible to convey the document which is fed using the pickup roller 51 to the pair of discharging rollers 86 without passing through the image forming position using means for conveying a document including the reverse conveying path 16, the driving roller 87a, the roller 87c, and the document discharging path 15.

As described above, the printer 1A according to the second embodiment can be downsized similarly to that in the first embodiment, and can convey the document G to the image reading portion 6 again without causing the document to pass through the image forming portion 3, by reversing the document using the reverse conveying path 16, when performing miniaturizing. For this reason, it is possible to prevent the document G from getting dirty, or from being damaged when reading an image on the document G. In this manner, it is possible to realize a downsized printer, and to perform double-sided reading without causing the document to be damaged.

Third Embodiment

Subsequently, a printer 1B according to a third embodiment of the present invention will be described with reference to FIGS. 10 to 12. The printer 1B according to the third embodiment is different from that in the first embodiment by including a document U-turn path 17 which branches from a U-turn conveying path 13. For this reason, in the third embodiment, the difference from that in the first embodiment, that is, the document U-turn path 17, will be mainly described, and the same constituent elements as those of the printer 1 according to the first embodiment will be given the same reference numerals, and descriptions thereof will be omitted.

First, a schematic configuration of the entire printer 1B according to the third embodiment will be described with reference to FIG. 10.

Figure 10:
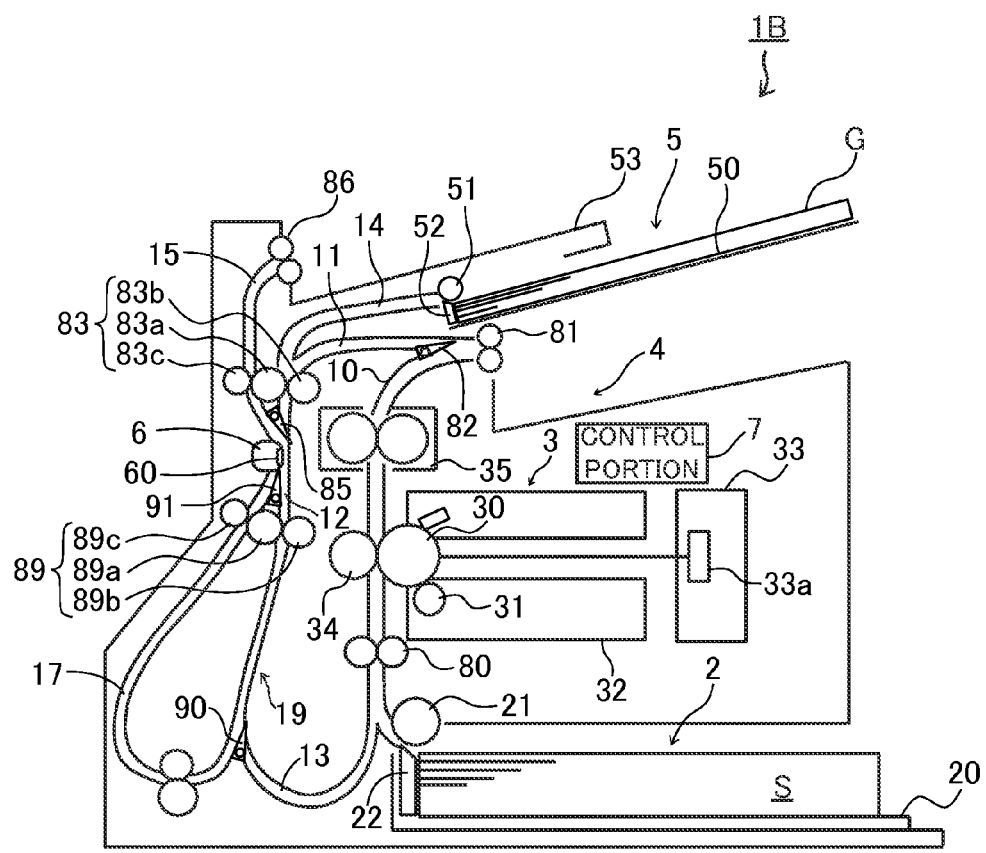
FIG. 10 is a cross-sectional view which schematically illustrates a printer according to a third embodiment of the present invention.

As illustrated in FIG. 10, the printer 1B includes a sheet feed portion 2, an image forming portion 3, a discharged sheet stacking portion 4, a document feed portion 5, a discharged document stacking portion 53, an image reading portion 6, and a control portion 7. In addition, the printer 1B includes a sheet conveying path 10 (first conveying path), a reverse conveying path 11, a common conveying path 12, a U-turn conveying path 13, a document feeding path 14, a document discharging path 15, and the document U-turn path 17 which configures means for conveying a document again. In addition, similarly to the first embodiment, the reverse conveying path 11, the common conveying path 12, and the U-turn conveying path 13 configure a duplex conveying path 19 (second conveying path). In addition, a document conveying path 100 is formed by the document feeding path 14, the document discharging path 15, the common conveying path 12, the document U-turn path 17, and the like.

The document U-turn path 17 branches toward a side opposite to the sheet conveying path 10 in the vicinity of a lower end portion of the U-turn conveying path 13, makes a U-turn toward the upper part in the vicinity of a side portion of the printer 1B, and is connected to the common conveying path 12. That is, the document U-turn path 17 is a conveying path which connects a downstream side end of the common conveying path 12 in the document conveyance direction, and the common conveying path 12 which is located on the upstream side of the downstream end in the document conveyance direction and on the downstream side of the image reading portion 6 (reading sensor 61), and returns the document to the common conveying path 12 by causing the document to make a U-turn.

A fourth switching member 90 is provided as a switching member at the branching portion of the U-turn conveying path 13 and the document U-turn path 17. The fourth switching member 90 guides the document G to the document U-turn path 17 when the document G enters the U-turn conveying path 13. In addition, a fifth switching member 91 as a switching member is provided at a merge portion of the document U-turn path 17 and the common conveying path 12. The fifth switching member 91 guides a sheet S and the document G, which move on the common conveying path 12 to the U-turn conveying path 13, and guides the document G which moves on the document U-turn path 17 to the common conveying path 12. According to the embodiment, in the image reading portion 6, a reading sensor 61 is provided so as to face the common conveying path 12 through a reading portion cover 60. That is, the image reading portion 6 is arranged by being fixed so that a sensor face of the reading sensor 61 which reads an image faces the common conveying path 12 on the downstream side of the branching portion of the one conveying path and the common conveying path in the document conveyance direction.

In addition, a triple roller for double-side conveyance (document conveying roller) 89 is provided on the downstream end of the document U-turn path 17 in the document conveyance direction. The triple roller for double-side conveyance 89 is configured of a driving roller 89a, and rollers 89b and 89c which are provide on double-sides of the driving roller 89a, and has a configuration of a triple roller in which the roller 89b and the roller 89c nip double-sides of the driving roller 89a with a predetermined pressure.

The triple roller for double-side conveyance 89 can convey the sheet S and the document G to the downstream side of the U-turn conveying path 13 in the sheet conveyance direction (downward direction in FIG. 1) by driving the driving roller 89a normally. In addition, the triple roller for double-side conveyance 89 can convey the document G which is guided to the document U-turn path 17 by driving the driving roller 89a normally to the downstream side of the document discharging direction which is a direction opposite to the document feeding direction (upward direction in FIG. 1).

Subsequently, an image reading operation (double-sided reading) using the printer 1B which is configured as described above will be described with reference to FIGS. 11A to 12. In addition, since an image forming operation using the printer 1B (simplex printing and duplex printing) is the same as that in the first embodiment, descriptions thereof will be omitted here.

When reading an image on the documents G, the documents G are sent out one by one by rotating the pickup roller 51, are separated one by one by the separation section 52, and are fed to the document feeding path 14. The document G which is fed to the document feeding path 14 is conveyed to the downstream side (downward) of the document G in the document feeding direction along the common conveying path 12 using the driving roller 83a and the roller 83b. In this manner, when the document G passes through the image reading section 6, an image on the first face of the document G is read. The read image information is stored in the memory M (refer to FIG. 2) as image information on the first face of the document G.

Figure 11A:
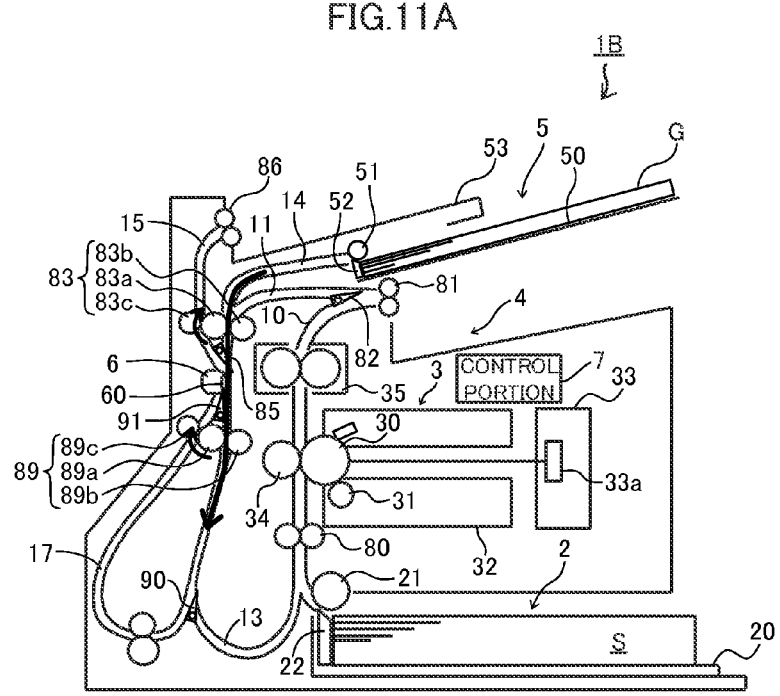
FIG. 11A is a cross-sectional view which illustrates a movement of a document which is conveyed to a common conveying path in an image reading operation of the printer according to the third embodiment.

As illustrated in FIG. 11A, the document G which has passed through the image reading portion 6 is guided to the U-turn conveying path 13 using a fifth switching member 91, and is conveyed along the U-turn conveying path 13 using the driving roller 89a and the roller 89b.

Figure 11B:
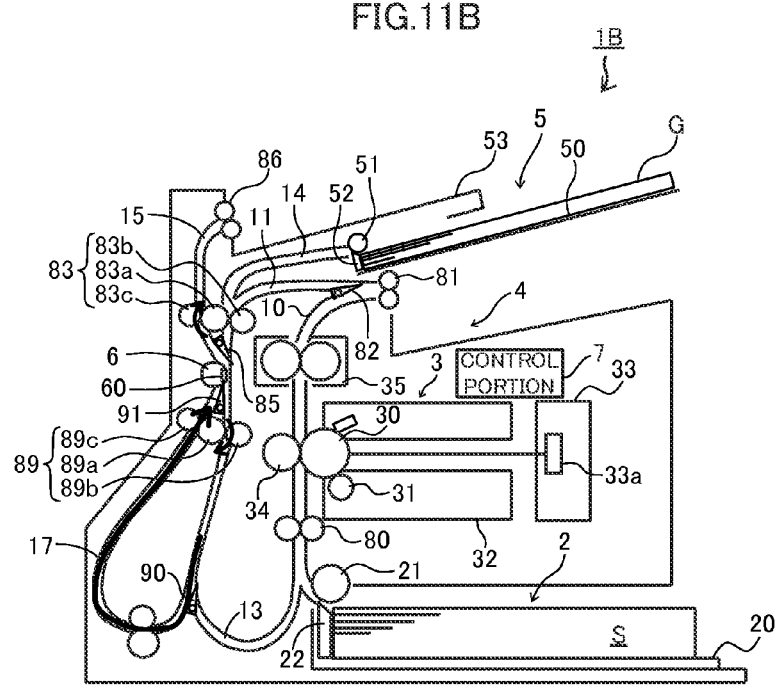
FIG. 11B is a cross-sectional view which illustrates a movement of the document which makes a U-turn in the document U-turn path, in the image reading operation of the printer according to the third embodiment.

Subsequently, the document G is guided to the document U-turn path 17 by the fourth switching member 90 at a branching portion of the U-turn conveying path 13 and the document U-turn path 17. As illustrated in FIG. 11B, when the document G reaches a nip between the driving roller 89a and the roller 89c, the document G is guided to the common conveying path 12 by the fifth switching member 91, the driving roller 89a, and the roller 89c. An image on the second face of the document G which is guided to the common conveying path 12 is read by the image reading portion 6 by passing through the common conveying path 12. The read image information is stored in the memory M (refer to FIG. 2) as image information on the second face of the document G.

Figure 12:
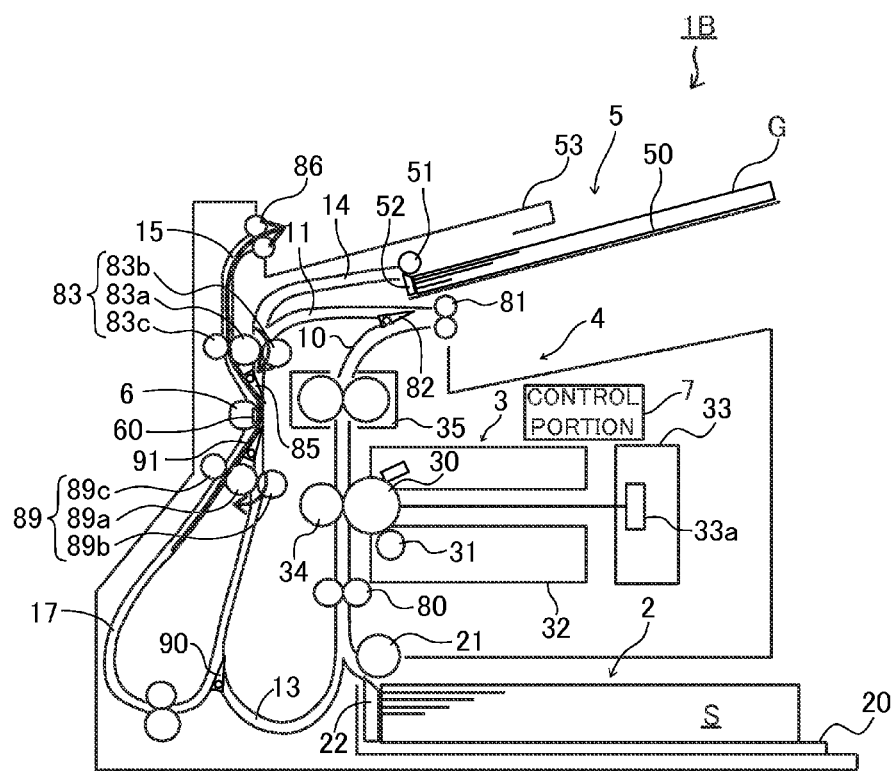
FIG. 12 is a cross-sectional view which illustrates a movement of the document which is guided to a document discharging path in the image reading operation of the printer according to the third embodiment.

As illustrated in FIG. 12, the document G which has passed through the image reading portion 6 is guided to the document discharging path 15 by the second switching member 85 and is conveyed to the upper part toward the pair of discharging rollers 86 along the document discharging path 15 using the driving roller 83a and the roller 83c. The document G which is conveyed on the document discharging path 15 is discharged to the discharged document stacking section 53 using the pair of discharging rollers 86 which is provided on the downstream end of the document discharging path 15, and is stacked onto the discharged document stacking section 53. In this manner, it is possible to convey the document which is fed using the pickup roller 51 to the pair of discharging rollers 86 without passing through a transfer position (image forming position) of an image using the means for conveying a document including the document U-turn path 17, the triple roller for double-side conveyance 89, and the document discharging path 15.

In addition, when the image forming operation of duplex printing is performed, the fourth switching member 90 is rotationally moved counterclockwise, the sheet S is moved toward the sheet conveying path 10 along the U-turn conveying path 13, and the same image forming operation as that in the first embodiment is performed.

As described above, in the printer 1B according to the third embodiment, it is possible to convey the document G to the image reading portion 6 again without causing the document to pass through the image forming portion 3, by causing the document to make a U-turn in the document U-turn path 17 which branches from the U-turn conveying path 13, when miniaturizing the printer. For this reason, it is possible to prevent the document G from getting dirty, or from being damaged when reading an image on the document G. In this manner, it is possible to realize a downsized printer, and to perform double-sided reading without causing the document to be damaged.

In addition, as illustrated in FIGS. 11A to 12, since switching in the rotation direction of various rollers, or a rotation operation of the image reading portion 6 is not necessary in the printer 1B according to the third embodiment, it is possible to realize a downsized printer with a simpler structure. In addition, it is possible to reduce the number of components by adopting a simple structure, and to suppress a manufacturing cost.

Fourth Embodiment

Subsequently, a printer 1C according to a fourth embodiment of the present invention will be described with reference to FIGS. 13 to 15. The printer 1C according to the fourth embodiment is different from that in the first embodiment by including a document branching path 18 which is branched from a U-turn conveying path 13. For this reason, in the fourth embodiment, the difference from that in the first embodiment, that is, the document branching path 18, will be mainly described, and the same constituent elements as those of the printer 1 according to the first embodiment will be given the same reference numerals, and descriptions thereof will be omitted.

First, a schematic configuration of the entire printer 1C according to the fourth embodiment will be described with reference to FIG. 13.

Figure 13:
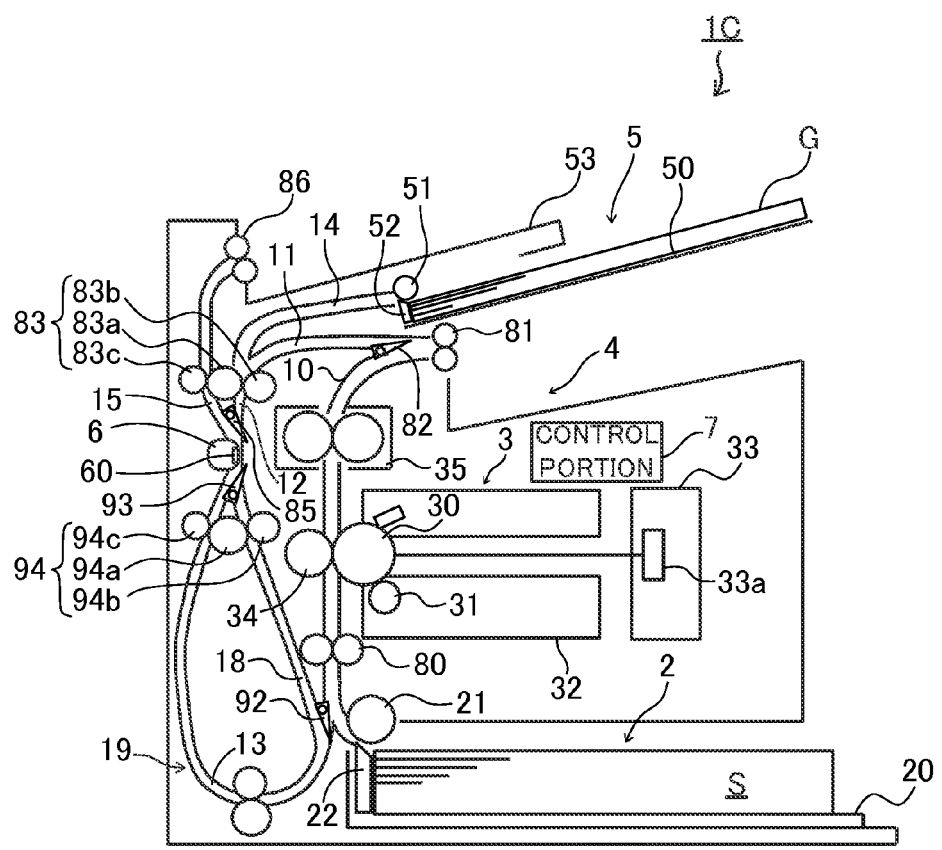
FIG. 13 is a cross-sectional view which schematically illustrates a printer according to a fourth embodiment of the present invention.

As illustrated in FIG. 13, the printer 1C includes a sheet feed portion 2, an image forming portion 3, a discharged sheet stacking portion 4, a document feed portion 5, a discharged document stacking portion 53, an image reading portion 6, and a control portion 7. In addition, the printer 1C includes a sheet conveying path 10 (first conveying path), a reverse conveying path 11, a common conveying path 12, a U-turn conveying path 13, a document feeding path 14, a document discharging path 15, and the document branching path 18 which configures a document re-conveyance portion. In addition, similarly to the first embodiment, the reverse conveying path 11, the common conveying path 12, and the U-turn conveying path 13 configure a duplex conveying path 19 (second conveying path).

The document branching path 18 branches from the U-turn conveying path 13 in the vicinity of a merge portion of the U-turn conveying path 13 and the sheet conveying path 10, and is connected to the common conveying path 12. A sixth switching member 92 as a switching member is provided at a branching portion of the U-turn conveying path 13 and the document branching path 18. When the document G enters the U-turn conveying path 13, the sixth switching member 92 guides the document G to the document branching path 18. In addition, a seventh switching member 93 as a switching member is provided at a merge portion of the document branching path 18 and the common conveying path 12. The seventh switching member 93 guides a sheet S and the document G which move on the common conveying path 12 to the U-turn conveying path 13, and guides the document G which moves on the document branching path 18 to the common conveying path 12. In addition, according to the embodiment, the image reading portion 6 is provided so that a reading sensor faces the common conveying path 12 through a reading portion cover 60.

In addition, a triple roller for double-side conveyance 94 is provided on the downstream end of the document branching path 18 in the document conveyance direction. The triple roller for double-side conveyance 94 is configured of a driving roller 94a and rollers 94b and 94c which are provided on double-sides of the driving roller 94a, and has a configuration of a triple roller in which the roller 94b and the roller 94c nip double-sides of the driving roller 94a with a predetermined pressure. The triple roller for double-side conveyance 94 can convey the sheet S and the document G to the downstream side of the U-turn conveying path 13 in the sheet conveyance direction (downward direction in FIG. 1) by driving the driving roller 94a normally. In addition, the triple roller for double-side conveyance 94 can convey the document G which is guided to the document branching path 18 by rotatably driving the driving roller 94a normally to the downstream side of the document discharging direction which is a direction opposite to the document feeding direction (upward direction in FIG. 1).

Subsequently, an image reading operation (double-sided reading) using the printer 1C which is configured as described above will be described with reference to FIGS. 14A to 15. In addition, since an image forming operation using the printer 1C (simplex printing and duplex printing) is the same as that in the first embodiment, descriptions thereof will be omitted here. In addition, since up to reading of the first face of the document G is the same as that in the third embodiment, hereinafter, operations of the document G after being read on the first face will be described.

Figure 14A:
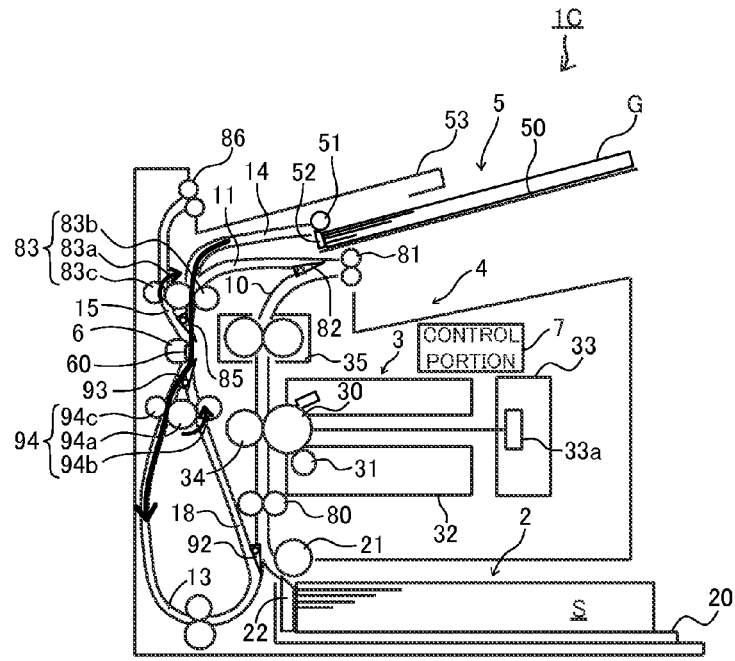
FIG. 14A is a cross-sectional view which illustrates a movement of a document which is guided to a U-turn conveying path in an image reading operation of the printer according to the fourth embodiment.

As illustrated in FIG. 14A, the document G which has passed through the image reading portion 6 is guided to the U-turn conveying path 13 using the seventh switching member 93, and is conveyed along the U-turn conveying path 13 by the driving roller 94a, and the roller 94c.

Figure 14B:
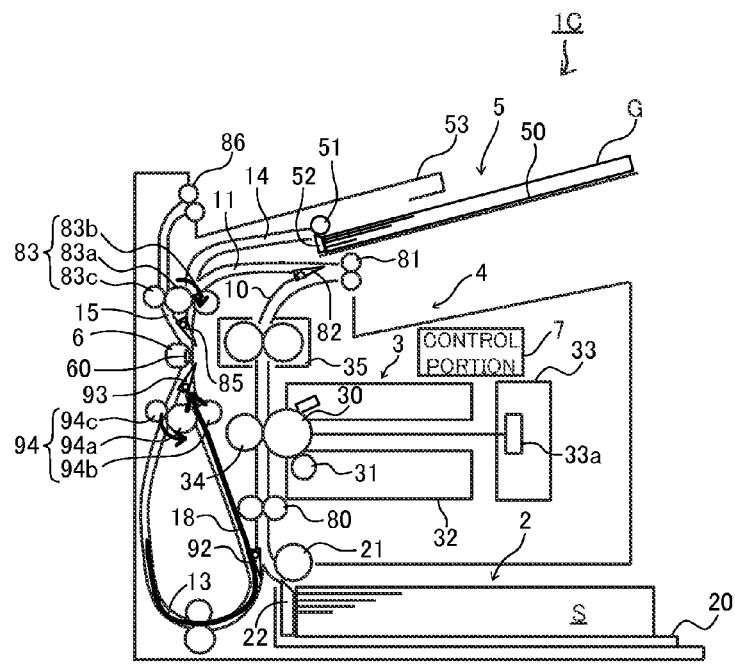
FIG. 14B is a cross-sectional view which illustrates a movement of the document which makes a U-turn in the U-turn conveying path in the image reading operation of the printer according to the fourth embodiment.

Subsequently, the document G is guided to the document branching path 18 by the sixth switching member 92 at a branch portion of the U-turn conveying path 13 and the document branching path 18. As illustrated in FIG. 14B, when the document G reaches a nip between the driving roller 94a and the roller 94b, the seventh switching member 93 is switched so that the document is guided to the common conveying path 12, and the document is guided to the common conveying path 12 by the driving roller 94a and the roller 94b. An image on the second face of the document G which is guided to the common conveying path 12 is read by the image reading section 6 by passing through the common conveying path 12. The read image information is stored in the memory M (refer to FIG. 2) as image information on the second face of the document G.

Figure 15:
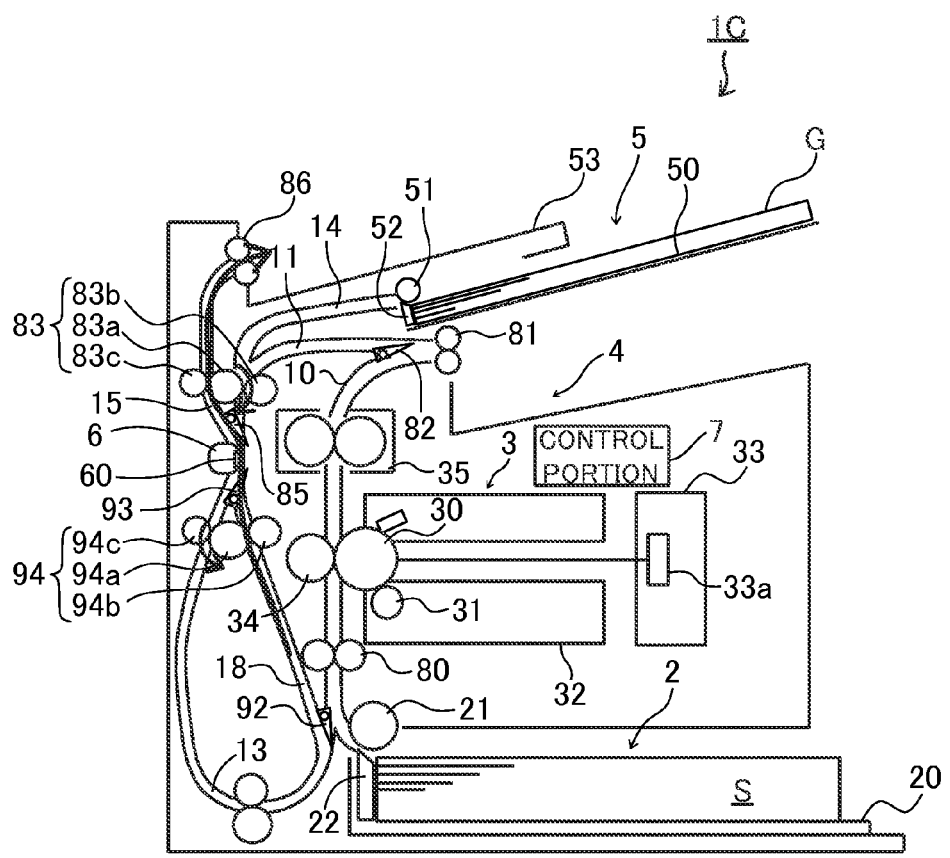
FIG. 15 is a cross-sectional view which illustrates a movement of the document which is guided to the document discharging path in the image reading operation of the printer according to the fourth embodiment.

As illustrated in FIG. 15, the document G which has passed through the image reading portion 6 is guided to the document discharging path 15 by the second switching member 85, and is conveyed to the upper part toward the pair of discharging rollers 86 along the document discharging path 15 using the driving roller 83a and the roller 83c. The document G which is conveyed on the document discharging path 15 is discharged to the discharged document stacking section 53 using the pair of discharging rollers 86 which is provided on the downstream end of the document discharging path 15, and is stacked onto the discharged document stacking section 53.

In addition, when the image forming operation of duplex printing is performed, the sixth switching member 92 is rotationally moved counterclockwise, the sheet S is moved toward the sheet conveying path 10 along the U-turn conveying path 13, and the same image forming operation as that in the first embodiment is performed.

As described above, in the printer 1C according to the fourth embodiment, it is possible to convey the document G to the image reading portion 6 again without causing the document to pass through the image forming portion 3, by causing the document to make a U-turn in the document branching path 18 which branches from the U-turn conveying path 13, when downsizing the printer. For this reason, it is possible to prevent the document G from getting dirty, or from being damaged when reading an image on the document G. In this manner, it is possible to realize a downsized printer, and to perform double-sided reading without causing the document to be damaged. In this manner, it is possible to convey the document which is fed using the pickup roller 51 to the pair of discharging rollers 86 without passing through the image forming position using the means for conveying a document including the U-turn conveying path 13, the document branching path 18, the triple roller for double-side conveyance 94, and the document discharging path 15.

In addition, in the printer 1C according to the fourth embodiment, since it is possible to make a conveyance region of the document G smaller than that in the printer 1B according to the third embodiment, it is possible to realize a smaller apparatus than the printer 1B according to the third embodiment.

As described above, the embodiments of the present invention have been described; however, the present invention is not limited to the above described embodiments.

For example, in each of the above described embodiments, positions of the document feed portion 51 and the document discharging portion 86 may be exchanged. In this case, since the conveyance direction of the document is reversed, a procedure of the conveyance control of the document also becomes reversed with respect to that which is described in the embodiment. In addition, the effect which is described in the embodiment of the present invention is simply the most suitable effect which can be obtained in the invention, and the effect of the present invention is not limited to the descriptions in the embodiment of the present invention.

In the embodiment, a printer including the discharged document stacking portion and the document discharging path has been exemplified; however, the printer in the present invention is not limited to this. For example, the printer may have a configuration in which the discharged document stacking portion and the document discharging path are not provided, and a document of which an image is read is discharged to a discharged sheet stacking portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-092113, filed on Apr. 25, 2013, which is hereby incorporated by reference herein in its entirety.

What is claimed is:

1. An image forming apparatus comprising:
    a sheet feed portion configured to feed a sheet;
    an image forming portion configured to form an image on the sheet which is fed from the sheet feed portion at an image forming position;
    a sheet discharging portion configured to discharge the sheet on which the image is formed by the image forming portion;
    a first conveying path which connects between the sheet feed portion and the sheet discharging portion, and on which the image forming portion is arranged;
    a second conveying path configured to guide the sheet on which the image has been formed on one surface thereof by the image forming portion to the first conveying path again;
    a document feed portion configured to feed a document;
    a document discharging portion configured to discharge the document which is fed from the document feed portion;
    a document conveying path including a document feeding path which is connected to the document feed portion, a document discharging path which is connected to the document discharging portion, and a common conveying path which serves as at least a part of the second conveying path, and guiding the document from the document feed portion to the document discharging portion through the document feeding path, the common conveying path and the document discharging path without causing the document to pass through the image forming position; and
    a reading portion configured to read a first face and a second face of the document fed from the document feed portion during when the document is conveyed through the document conveying path.

2. The image forming apparatus according to claim 1, wherein one conveying path of the document feeding path or the document discharging path is that at least a part thereof is arranged so as to be parallel to the common conveying path, and one end portion thereof connects the common conveying path at a connecting portion, and
    wherein the reading portion is arranged between the one conveying path and the common conveying path, and is configured so as to be movable between a first position at which an image on the document which is conveyed on the common conveying path is read and a second position at which an image on the document which is conveyed on the one conveying path is read.

3. The image forming apparatus according to claim 2, further comprising:
    a pair of document reversing rollers which can perform a normal rotation and a reverse rotation, and is provided on a downstream side of the connection portion in a document conveyance direction;
    a switching member which switches a conveying path of the document in the connecting portion; and
    a control portion which conveys the document which is fed to the connecting portion from the document feed portion along the common conveying path by rotatably driving the pair of document reversing rollers, switches the document back by reversing a rotation direction of the document reversing roller after a rear end of the document has passed through the switching member, and switches the switching member so that the document which is switched back goes toward the document discharging path.

4. The image forming apparatus according to claim 3, wherein the one conveying path is the document discharging path,
    wherein the document feeding path is connected to the common conveying path, and feeds the document to the connecting portion through the common conveying path, and
    wherein the reading portion is configured so as to be movable between the first position and the second position, reads an image on the first face of the document at the first position, when the document is conveyed on the common conveying path, and reads an image on the second face of the document at the second position, when the document is conveyed on the document discharging path.

5. The image forming apparatus according to claim 4, wherein the first and second conveying paths are configured so that a sum of a length of the second conveying path between the switching member and the connecting portion of the second conveying path and the first conveying path, and a length of the first conveying path between the connecting portion and the image forming portion is longer than a maximum length of a document which can be fed by the document feed portion.

6. The image forming apparatus according to claim 5, further comprising:
- a first roller which is provided on the common conveying path side;
- a second roller which is provided on the document discharging path side; and
- a rotating roller which is arranged between the first roller and the second roller,
- wherein the rotating roller forms a first nip portion with the first roller, and forms a second nip portion with the second roller, and
- wherein the rotating roller conveys the document on the common conveying path toward the reading portion by rotating in a first direction, and conveys the document on the original document discharging path toward the document discharging portion by rotating in a second direction which is opposite to the first direction.

7. The image forming apparatus according to claim 3, wherein the one conveying path is the document discharging path,
- wherein the document feeding path is connected to the common conveying path, and feeds the document to the connecting portion through the common conveying path, and
- wherein the switching member guides the document to the reverse conveying path until a rear end of the document which is conveyed to the connecting portion through the document feeding path passes through the switching member, and is switched so that the document is conveyed to the document discharging path, after the rear end of the document passed through the switching member, and
- wherein the reading section is configured so as to be movable between the first position and the second position, reads an image on the first face of the document at the first position, when the document is conveyed on the common conveying path, and reads an image on the second face of the document at the second position, when the document is conveyed on the document discharging path.

8. The image forming apparatus according to claim 7, wherein the sheet discharging portion, the document feed portion, and the document discharging portion are arranged on an upper side of the branching portion of the common conveying path and the document discharging path,
- wherein the reverse conveying path is arranged so as to be parallel with the second conveying path on a lower side of the common conveying path and the document discharging path,
- wherein the document reverse conveyance portion includes a roller which is provided on the reverse conveying path side, a roller which is provided on the second conveying path side, and a rotating roller which is arranged between the reverse conveying path and the second conveying path which are arranged so as to face each other, and respectively forms a pair with the roller which is provided on the reverse conveying path side, and the roller which is provided on the second conveying path side, and
- wherein the rotating roller can retract the document on the reverse conveying path by rotating in a first direction, can switch the document back between the rotating roller and the roller which is provided on the reverse conveying path side by rotating in a second direction, and can convey a sheet on the second conveying path toward the first conveying path between the rotating roller and the roller which is provided on the second conveying path side.

9. The image forming apparatus according to claim 2, wherein the document conveying path includes a reverse conveying path which connects the common conveying path and the one conveying path at the connection portion, and receives the document before being switched back which is conveyed to the connecting portion, when the document which is fed from the document feed portion is conveyed toward the document discharging portion by being switched back.

10. The image forming apparatus according to claim 9, further comprising: a document reverse conveyance portion which is arranged on the downstream side of a branching portion of the common conveying path and the document discharging path in the document feeding direction, and is configured so as to convey the document which is fed from the document feed portion by reversing a conveyance direction of the document; and
- a switching member which guides the document which is conveyed to the connecting portion from the document feed portion toward the reverse conveying path, and switches a conveying path of the document so that the document which is switched back by the document reverse conveyance portion goes toward the document discharging path.

11. The image forming apparatus according to claim 1, wherein one conveying path of the document feeding path or the document discharging path joins the common conveying path at the connecting portion, and the other conveying path of the document feeding path or the document discharging path is connected to an upstream end of the common conveying path in the document conveyance direction, wherein the reading portion is arranged by being fixed so that a sensor face thereof which reads the image faces the common conveying path on the downstream side of a branching portion of the one conveying path and the common conveying path in the document conveyance direction, and
- wherein the document conveying path connects a downstream end of the common conveying path in the document conveyance direction and the common conveying path which is located on the upstream side of the downstream end in the document conveyance direction, and on the downstream side of the reading sensor, and includes a U-turn path which returns the document to the common conveying path by causing the document to make a U-turn.

12. The image forming apparatus according to claim 11, wherein the one conveying path is the document discharging path,
- wherein the other conveying path is the document feeding path, and
- wherein the reading portion reads an image on the first face when the document which is conveyed to the common conveying path from the document feeding path passes through the sensor face thereon, and reads an image on the second face when the document of which a conveyance direction is reversed on the U-turn path passes through the sensor face thereon again.

* * * * *